United States Patent
Hernandez et al.

(10) Patent No.: US 7,135,974 B2
(45) Date of Patent: Nov. 14, 2006

(54) POWER SOURCE SYSTEM FOR RF LOCATION/IDENTIFICATION TAGS

(75) Inventors: David Hernandez, Westbury, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 20 days.

(21) Appl. No.: 10/128,730

(22) Filed: Apr. 22, 2002

(65) Prior Publication Data

US 2003/0197613 A1  Oct. 23, 2003

(51) Int. Cl.
*G08B 13/14* (2006.01)

(52) U.S. Cl. .............. 340/572.1; 340/539.1; 340/539.13; 340/636.1

(58) Field of Classification Search .......... 340/572.1, 340/572.8, 310.01–310.08
See application file for complete search history.

(56) References Cited

U.S. PATENT DOCUMENTS

| 5,300,875 | A |   | 4/1994  | Tuttle ..................... 320/138 |
|---|---|---|---|---|
| 5,689,242 | A | * | 11/1997 | Sims et al. ............... 340/652 |
| 5,697,061 | A |   | 12/1997 | Krueger et al. ............ 455/39 |
| 5,796,338 | A | * | 8/1998  | Mardirossian ............ 340/571 |
| 5,905,442 | A | * | 5/1999  | Mosebrook et al. ........ 340/3.7 |
| 6,084,379 | A | * | 7/2000  | Buniatyan ................ 320/101 |
| 6,170,059 | B1| * | 1/2001  | Pruett et al. ............. 713/200 |
| 6,229,433 | B1| * | 5/2001  | Rye et al. ............. 340/310.01 |
| 6,380,852 | B1| * | 4/2002  | Hartman et al. .......... 340/521 |
| 6,463,039 | B1| * | 10/2002 | Ricci et al. ............. 370/277 |
| 6,577,239 | B1| * | 6/2003  | Jespersen .............. 340/572.1 |
| 2003/0229736 | A1 | * | 12/2003 | Shih ...................... 710/62 |

FOREIGN PATENT DOCUMENTS

| DE | 10012204   | 9/2001 |
|---|---|---|
| GB | 2342537    | 4/2000 |
| WO | WO 01/69517 | 9/2001 |
| WO | WO 02/31762 | 4/2002 |

* cited by examiner

*Primary Examiner*—Benjamin C. Lee
*Assistant Examiner*—Son Tang
(74) *Attorney, Agent, or Firm*—Fay Kaplun & Marcin, LLP.

(57) ABSTRACT

Described is a RF device (e.g., an RF tag) which includes a communication arrangement and an input arrangement. The communication arrangement sends and/or receives data relating to a target device. The RF device may also include a memory for storing the target device data. The input arrangement is coupled to the target device. The RF device obtains power from the target device through the input arrangement. The described RF device is provided with a viable alternative to a full reliance on a stand alone battery.

23 Claims, 5 Drawing Sheets

POWER SOURCE SYSTEM FOR RF LOCATION/IDENTIFICATION TAGS

BACKGROUND INFORMATION

Radio Frequency ("RF") device, such as RF identification device, has become an important implementation of an Automatic Identification technique. The object of any RF system is to carry data suitable transponders, generally known as tags, and to retrieve data, by machine-readable means, at a desired time and place to satisfy particular application needs.

Data within a tag may provide identification for an item in manufacture, goods in transit, a location, the identity of a vehicle, an animal, individual, etc. Additional data may be provided for supporting applications through item specific information or instructions immediately available on reading the tag. For example, the color of paint for a car body entering a paint spray area on the production line, the set-up instructions for a flexible manufacturing cell or the manifest to accompany a shipment of goods. In other cases, information may be obtained, indirectly, merely by observing the characteristics of the tags' transmissions—signal strength, multipath delay profile, or time of arrival, for example. RF technologies vary widely in frequency, packaging, performance, and cost.

FIG. 1 shows a conventional RF system 1 which includes an RF tag 10 (e.g., an RFID tag) and an RF arrangement 2 for reading or interrogating the tag 10. The arrangement 2 communicates with a data processing unit 3 to exchange data with the tag 10. The system 1 may also include a facility (not shown) for entering or programming data into the tag 10, if this is not undertaken at source by the manufacturer of the tag 10.

Communications of data between the tag 10 and the arrangement 2 may be performed using a wireless communication technology. Two methods distinguish and categorize RF systems: a first method is based upon close proximity electromagnetic or inductive coupling; and a second method is based upon propagating electromagnetic waves. Coupling is via 'antenna' structures 4, 12 forming an integral feature in both the tag 10 and the arrangement 2. While the term "antenna" is generally considered more appropriate for propagating systems, it is also loosely applied to inductive systems.

Transmitting data is subject to the influences of the media or channels through which the data has to pass, including the air interface. Noise, interference and distortion are the sources of data corruption that arise in practical communication channels that must be guarded against in seeking to achieve error free data recovery. The nature of the data communication processes requires attention to the form in which the data is communicated. Structuring the bit stream to accommodate these needs is often referred to as channel encoding and, although transparent to the user of an RF system, the coding scheme applied appears in system specifications. Various encoding schemes can be distinguished, each exhibiting different performance features.

To transfer data efficiently via the air interface or space that separates the two communicating components requires the data to be superimposed upon a rhythmically varying (sinusoidal) field or carrier wave. This process of superimposition is referred to as modulation, and various schemes are available for this purposes, each having particular attributes that favor its use.

RF tags may be either active or passive. A passive tag has a limited utilization (e.g., a theft prevention device in a store). On the other hand, an active tag may provide a plurality of data which can be modified. FIG. 1 shows a conventional active tag 10 including a transmitter or transceiver arrangement 12 which can send to the arrangement 2 data identifying information, current status, current location, or other useful data. In addition, the tag 10 has a battery and may also include a microprocessor 14 and a memory 18. In some cases, the data stored on the memory 18 maybe rewritten and/or modified. However, a disadvantage of the active tag 10 is that the RF transmissions require a significant amount of power. This power requirement results in the additional cost of self-contained battery and the limited operational life of the battery leads to the expense of frequently replacing the batteries and/or the tags themselves.

SUMMARY OF THE INVENTION

The present invention relates to a radio frequency ("RF") device (e.g., an RF tag) which includes a communication arrangement and an input arrangement. The communication arrangement sends and/or receives data. The radio frequency device obtains power from the target device through the input arrangement. Thus, the radio frequency device according to the present invention is provided with a viable alternative to a full reliance on a stand alone battery.

DETAILED DESCRIPTION

According to present invention, a radio frequency ("RF") device, such as an active RF tag, is adapted to obtain power from a viable alternative to a full reliance on a stand alone battery. The active RF tag may be able to receive and transmit RF signals using a plurality of wireless local area network ("WLAN") communication standards (e.g. IEEE 802, IEEE 802.11, etc.). The power may be obtained from a variety of sources, for example, direct, in-line, inductive and/or solar power sources which are described in detail below.

Figure 1:
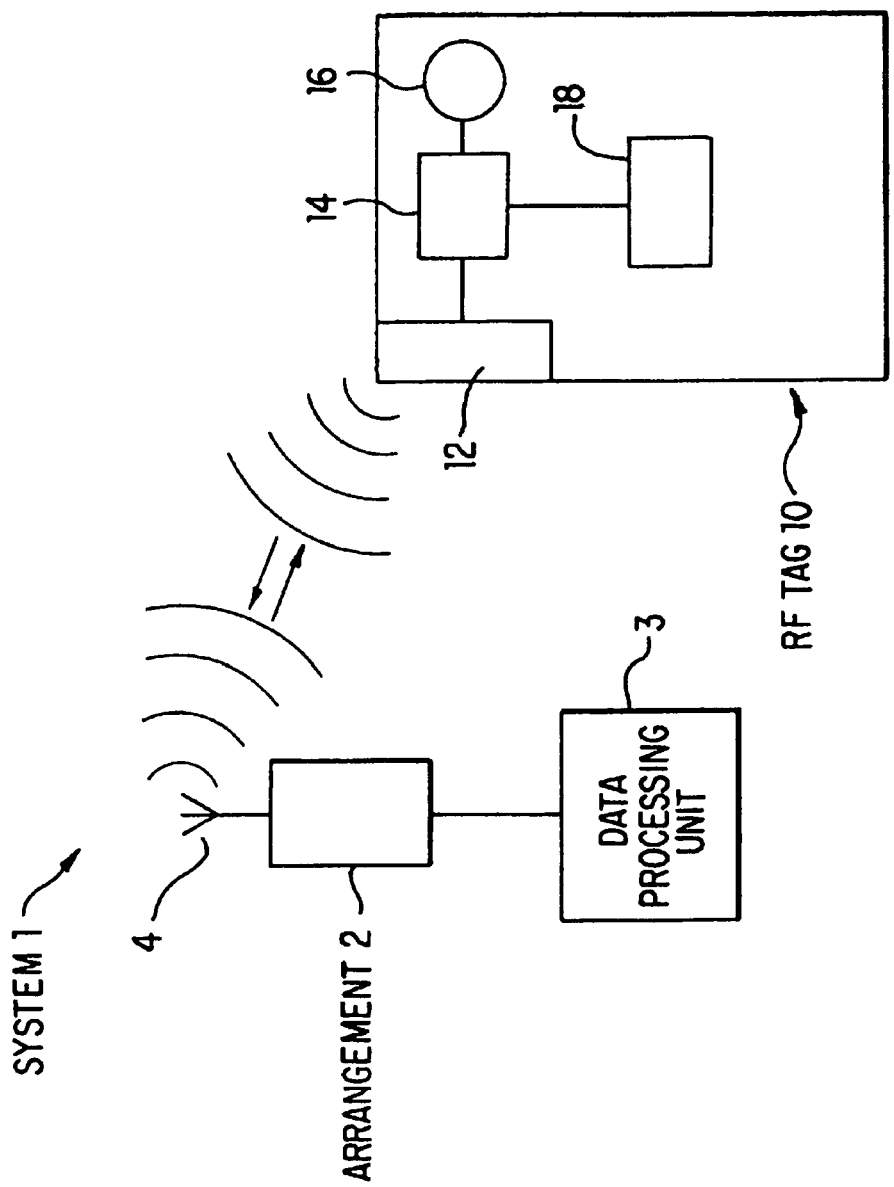
FIG. 1 shows a conventional RF system.
Figure 2:
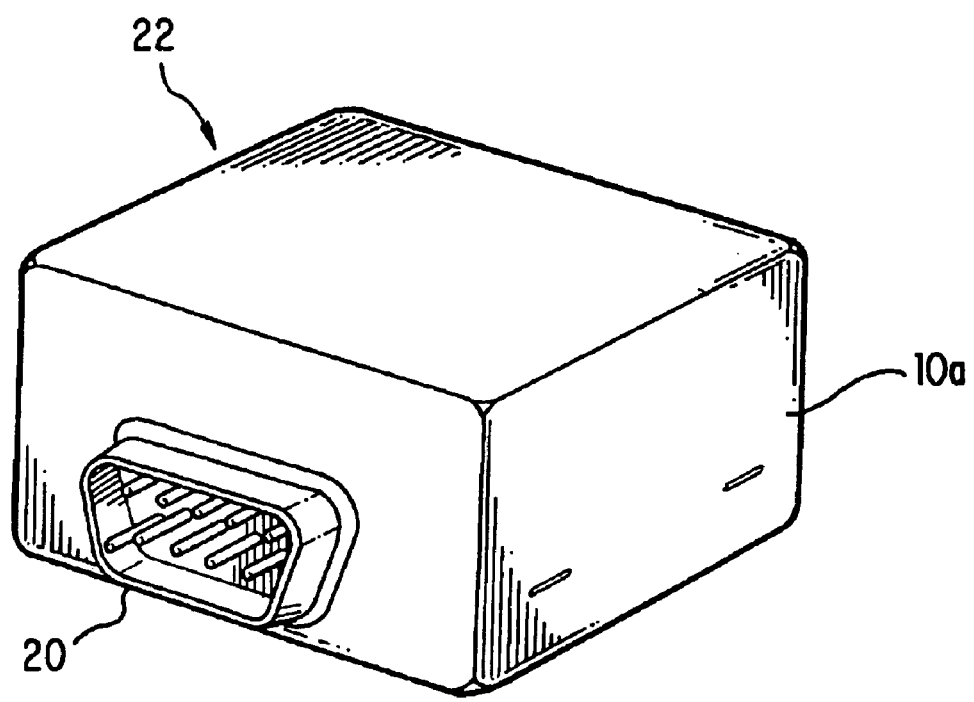
FIG. 2 shows an exemplary embodiment of an active RF tag according to the present invention.

FIG. 2 shows an exemplary embodiment of a device 22 including a RF tag 10a according to the present invention. The device 22 has a serial interface connector 20 which may be used to obtain or provide data and power for RF tag 10a. The RF tag 10a, situated inside the device 22, obtains its power source feeding the power in connection of the serial interface 20. Those skilled in the art would understand that power may be obtained from any type of interface connector which transmits power, such as, Universal Serial Bus ("USB"), a "firewire" (i.e., IEEE 1394), parallel, microphone, etc.

Examples of products which enable such tags are laptops, personal digital assistance (PDAs), medical equipment, etc. These devices generally have the type of connections described above. Thus, a RF device such as exemplary device 22 may acquire power from the target device (e.g., laptop, PDA) via the appropriate connection. In this manner, the power supply of the target device does not need to be disturbed. Those of skill in the art will understand that some minor modifications of the target device software may be needed to activate the port or connection where the RF tag 10a is connected.

Figure 3:
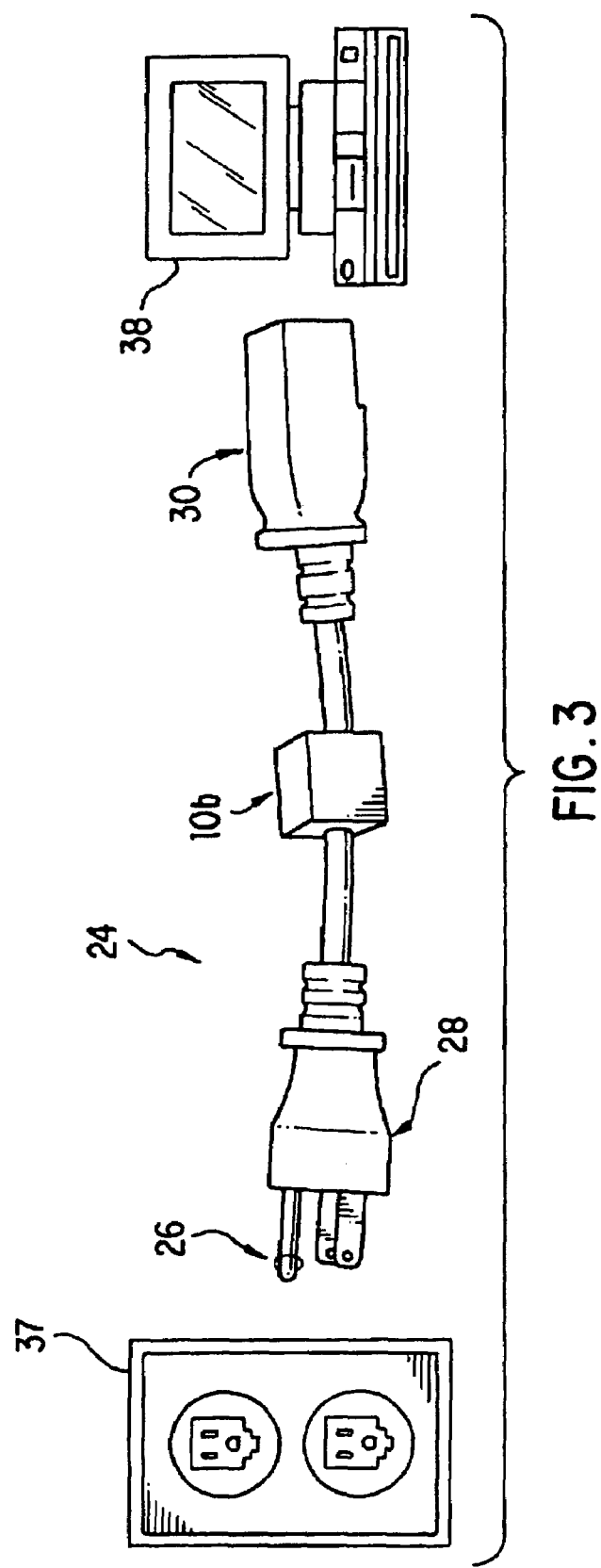
FIG. 3 shows another exemplary embodiment of an active RF tag according to the present invention.

FIG. 3 shows another exemplary embodiment of a device 24 including a RF tag 10b according to the present invention. The device 24 has a first connection 28 which is connected to a power source 37 and a second connection 30 which is connected to a target device 38 for which the RF tag 10b is designed. Thus, the device 24, which may be in the form of a short power cord, is inserted between the power source 37 and the target device 38. The RF tag 10b obtains its power from the power that flows between the power source 37 and the target device 38 through the device 24. The device 24 does not interrupt the power flow to the target device 38. In addition, the device 24 may use the third party ground plug 26 as an extension antenna for the RF tag 10b or for transmission/reception of data. The device 24 may be particularly useful for target devices which have power sources that are separate from the device itself, e.g., any device which is plugged into a wall outlet.

Figure 4:
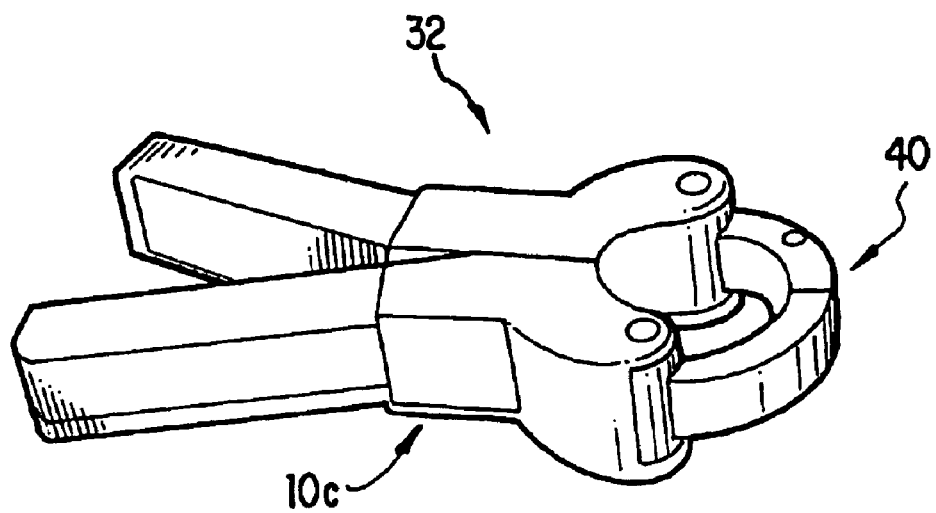
FIG. 4 shows yet another exemplary embodiment of an active RF tag according to the present invention.

FIG. 4 shows a further exemplary embodiment according to the present invention of a device 32 including a RF tag 10c and an inductive clamp 40. The tag 10c utilizes an inductive coupling as its power source rather being directly attached to a power supply or "in-line". The inductive coupling may be used so that the available magnetic fields emanating from a tracked device's current supply may be converted to power for the tag 10c. The device 32 may be hooked around a power cable by the inductive clamp 40 which provides power to the tag 10c. The device 32 may be particularly useful in applications where it is impractical to attach additional wires to the target device. Another manner for obtaining power via inductive forces is though the use of a current transformer (CT).

Figure 5:
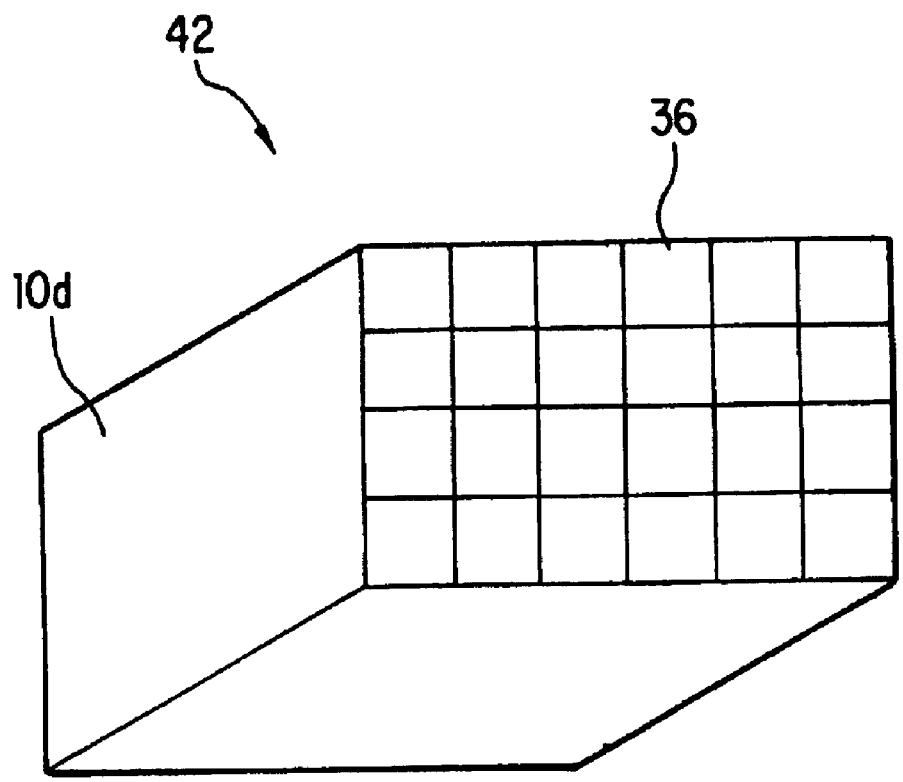
FIG. 5 shows a further exemplary embodiment of an active RF tag according to the present invention.

FIG. 5 shows yet another exemplary embodiment according to the present invention of a device 42 which includes a RF tag 10d and a solar power battery 36. In this embodiment, the tag 10d utilizes the power generated by the solar power battery 36, thus, allowing the tag 10d to function without a conventional battery. Those of skill in the art will understand that the device 42 may be especially useful in those cases where the application of the device 42 includes prolonged exposure to the light, e.g., an RF tag in a car for toll road use, an RF tag on outdoor equipment, etc.

Those skilled in the art would understand the above described alternative power sources for the RF tags may be utilized in addition to a conventional battery. For example, the tag 10c may utilize the power from both a battery and the inductive power generated from the clamp 40. The indicative power may directly serve the tag 10c or recharge the battery.

The devices according to the present invention may be utilized in various industries. For example, such devices may be utilized in a health care industry. The RF tags may be attached to a number of medical devices which move around a hospital. Having such tags allows the hospital to manage and track its equipment. At the same time, having such alternative power sources, allows the hospital to significantly reduces the maintenance cost associated with such tags because one of the above described tags may be utilized for any piece of hospital's equipment.

Another example of utilization of the present invention is in a retail industry. For instance, devices with the above described RF tags may be used as "proximity sensors". A particular supermarket may have a location tracking system which allows it to determine the location of shoppers. Thus, when a shopper approaches a particular area, e.g., a frozen food section, a personalized coupon on frozen dinners is offered to that shopper to entice him/her to make a purchase. Such may be achieve by placing RF tags as beacons in every section of the supermarket. The shopper may have a tag which reflects the beacon information (e.g., a preferred customer card) or RF equipment to receive the beacon information (e.g., PDA). The cost and time for maintenance of a such system may be reduced when these beacons/proximity sensors use the alternative power source as described above.

Thus, the present invention provides an alternative to stand-alone batteries. The alternatives include the reduction of the load on the tag's internal supplies, the discarding of internal sources entirely, a method of recharging the tag's batteries during normal, everyday usage, etc.

There are many modifications to the present invention which will be apparent to those skilled in the art without departing from the teaching of the present invention. The embodiments disclosed herein are for illustrative purposes only and are not intended to describe the bounds of the present invention which is to be limited only by the scope of the claims appended hereto.

What is claimed is:

1. A radio frequency identification (RFID) device, comprising:
   an input arrangement coupled to a power supply of a target device separate from the RFID device, wherein the radio frequency identification device obtains power from the power supply through the input arrangement; and
   a communication arrangement for at least one of receiving data from and sending data to a data processing unit located separate from the RFID device and the target device, wherein the data is independent of any operation of the target device.

2. The RFID device according to claim 1, further comprising:
   a memory arrangement storing the data.

3. The RFID device according to claim 1, wherein the input arrangement is one of a serial connector, a parallel connector, a USB connector, a firewire connector and a microphone connector.

4. The RFID device according to claim 1, wherein the target device power supply includes a power inductive arrangement, and wherein the input arrangement obtains the power generated by the power inductive arrangement.

5. The RFID device according to claim 1, wherein the target device includes a solar power arrangement, and wherein the input arrangement obtains the power generated by the solar power arrangement.

6. The RFID device according to claim 1, further comprising:
   a battery providing power to the RFID device.

7. The RFID device according to claim 6, wherein the battery is a rechargeable battery.

8. The RFID device according to claim 7, wherein the battery is recharged using the power obtained by the input arrangement.

9. The RFID device according to claim 2, further comprising:
   a processor processing, modifying and storing the data in the memory.

10. The RFID device according to claim 1, wherein the communication arrangement is an IEEE 802.11 compliant arrangement.

11. The RFID device according to claim 1, wherein the data processing unit is included in an RFID reader.

12. The RFID device according to claim 1, wherein the communication arrangement sent the data to the data processing unit via wireless communication.

13. A system, comprising:
a target device;
a radio frequency identification (RFID) separate from the target device and including a communication arrangement and an input arrangement, the input arrangement being coupled to a power supply of the target device, the radio frequency identification device obtaining power from the target device power supply through the input arrangement; and
a data processing unit located separate from the RFID device and the target device including a radio frequency receiver for at least one of sending to and receiving data from the radio frequency identification device wherein the data is independent of any operation the target device.

14. The system according to claim 13, wherein the radio frequency identification device includes a memory arrangement storing data.

15. The system according to claim 13, wherein the input arrangement is one of a serial connector, a parallel connector, a USB connector, a firewire connector and a microphone connector.

16. The system according to claim 13, wherein the target device includes a power inductive arrangement, and wherein the input arrangement obtains the power generated by the power inductive arrangement.

17. The system according to claim 13, wherein the target device includes a solar power arrangement, and wherein the input arrangement obtains the power generated by the solar power arrangement.

18. The system according to claim 13, wherein the radio frequency identification device includes a battery providing power to the radio frequency identification device.

19. The system according to claim 18, wherein the battery is a rechargeable battery.

20. The system according to claim 19, wherein the battery is recharged using the power obtained by the input arrangement.

21. The system according to claim 13, wherein the radio frequency identification device includes a processor processing, modifying and storing the data in the memory.

22. The system according to claim 13, wherein the communication arrangement is an IEEE 802.11 compliant arrangement.

23. The system according to claim 13, wherein the data processing unit is included in an RFID reader.

* * * * *